Figure 1:
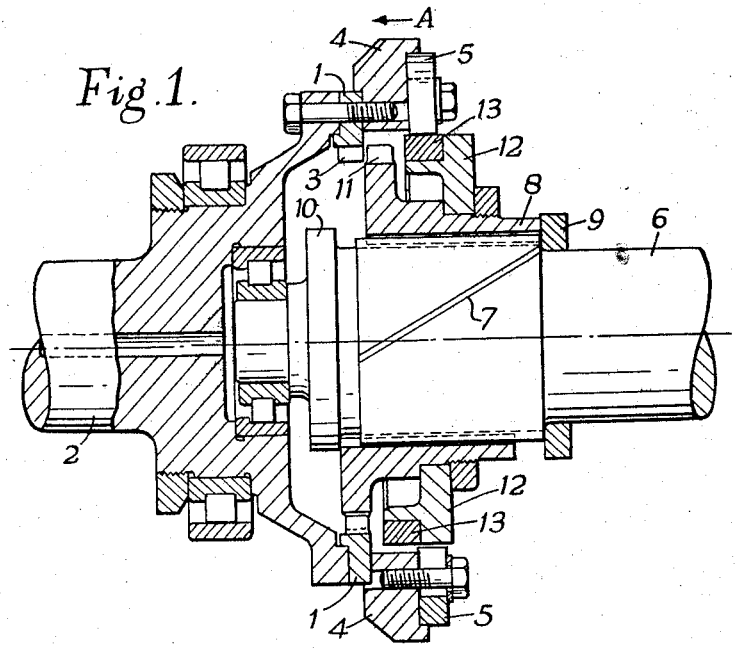

March 10, 1959  H. SINCLAIR ET AL  2,876,878
CLUTCHES FOR TRANSMITTING ROTARY MOTION
Filed Aug. 15, 1955  3 Sheets-Sheet 1

INVENTORS
Harold Sinclair
Arthur Cecil Basebe
BY
Benjamin Sweedler
ATTORNEY

March 10, 1959  H. SINCLAIR ET AL  2,876,878
CLUTCHES FOR TRANSMITTING ROTARY MOTION
Filed Aug. 15, 1955  3 Sheets-Sheet 2

INVENTORS
Harold Sinclair
Arthur Cecil Basebe
BY
Benjamin Sweedler
ATTORNEY

2,876,878

Patented Mar. 10, 1959

2,876,878

CLUTCHES FOR TRANSMITTING ROTARY MOTION

Harold Sinclair, Windsor, and Arthur Cecil Basebe, Twickenham, England, assignors to S. S. S. Gears Limited, Isleworth, England Application August 15, 1955, Serial No. 528,312

Claims priority, application Great Britain August 23, 1954

7 Claims. (Cl. 192—67)

This invention relates to jaw tooth clutches for transmitting rotary motion, said clutches being of the synchronous self-shifting type as disclosed in British patent specifications Nos. 354,711 and 410,083, wherein the sets of co-operating jaw clutch teeth are provided respectively on a first clutch member and on an intermediate member, the latter being constrained to move helically on a second member, e. g. by means of helical splines for the purpose of bringing the jaw clutch teeth on the intermediate member into and out of engagement with the jaw clutch teeth of the said first member.

In synchronous self-shifting clutches of this type the means most commonly employed for initiating clutch engagement comprise pawls which are carried by the intermediate member or the said first member and which are arranged so that, with the clutch disengaged, the noses of the pawls ratchet with a substantially radial motion over or under the teeth or other projections on the other of said members when there is a relative angular movement in the over-running sense between the first and second members, and so that when there tends to be relative angular movement in the other sense between the first and second members a pawl is picked up by a tooth or other projection on the co-operating clutch member whereby the intermediate member is moved axially along the helical splines on the second member to ensure clean inter-engagement of the teeth of the first and intermediate members.

The above-mentioned pawl synchronising mechanism works very well in practice except under conditions in which the part carrying the pawls has to operate at very high angular speeds such that the pawls cannot move freely on their pivot pins due to the heavy centrifugal loading on the pawls. It is undesirable on account of wear that the pawls should be allowed to ratchet for long periods at medium or high speeds, and hence for cases in which the clutch is required to overrun for long periods at medium or high relative angular speeds of the first and intermediate members auxiliary means are desirably provided for moving the pawls out of ratcheting engagement with the co-operating jaw clutch teeth.

Other means of initiating engagement of the clutch have been proposed, e. g. frictional means, though such means are somewhat uncertain in action and are not favoured for conditions involving long periods of operation and relative rotation at high angular speeds, or for high rates of acceleration at the moment of clutch engagement.

The object of the present invention is to overcome the above-mentioned difficulties associated with clutch engagement.

According to the invention there is provided an over-running clutch comprising a first clutch member provided with jaw clutch teeth, a second clutch member coaxial with said first clutch member, and an intermediate member provided with jaw clutch teeth and constrained to move helically on said second member for the purpose of bringing the jaw clutch teeth on the intermediate member into and out of engagement with the jaw clutch teeth of the said first clutch member, the clutch being provided with means whereby engagement of the co-operating sets of jaw clutch teeth on said first and intermediate members is initiated by magnetic force.

The magnetic force may conveniently be provided between the ring of magnets carried by the first member, and an armature in the form of a ring mounted on the intermediate member. The said armature may be a complete ring or it may be shaped to provide poles for co-operation with the said ring of magnets. Alternatively the magnets may be carried by the intermediate member, and the armature by the first clutch member.

Permanent magnets and/or electromagnets may be used, and adjustment of the magnetic force required for initiating clutch engagement may be effected, for example, by varying the distance between or the shape of the poles of the magnets and the armature.

In such an arrangement the force tending to bring the clutch teeth into inter-engagement due to the magnetic attraction between the magnets and the armature in the axial direcion of the clutch members is lower when the relative angular speed between the clutch members is high than when the relative angular speed between them is low, for the reason that there is a tangential drag force created by eddy current effects when there is a relative rotation between the magnets and the armature, or other suitable part of the clutch member carrying the armature which drag force acts in opposition to the axial force tending to bring the clutch teeth into engagement. The said tangential drag force, which can be increased by the provision of an eddy current ring, acts on the intermediate member that is constrained to move helically upon the second member and therefore tends to move it away from contact with the co-operating clutch teeth of the first member, thus diminishing (or even nullifying) the axial force between the first and intermediate members where the relative speed of rotation is high, and vice versa. The said tangential drag force which is created by the relative motion drops to zero when the relative rotation ceases and synchronism is reached, whereupon it has no effect upon the said axial magnetic force tending to cause initial engagement of the co-operating sets of jaw clutch teeth. The said axial magnetic force may be adjusted to bring the sets of teeth, on the first clutch member and the intermediate member respectively, into smooth sliding or nuzzling contact prior to synchronism until the relative rotation becomes substantially zero before reversal of relative rotation whereupon the intermediate clutch member is free to move axially and initial inter-engagement occurs as the sets of teeth on the first clutch member come opposite the gaps between the teeth on the intermediate member; the said reversal of rotation then causes the intermediate member to move helically on the second clutch member so as to bring the teeth of the intermediate member into full engagement with the clutch teeth of the first clutch member.

Alternative means may be used to increase the said desirable tangential drag force, e. g. means that make use of the drag effect of a liquid, which may conveniently be lubricating oil between adjacent parts of or on the first clutch member and the intermediate member, so as in effect to decrease, or even to nullify the said axial magnetic force tending to bring the clutch teeth into engagement when the relative speed of rotation is high. As the said relative speed decreases and approaches zero the said drag force disappears and the axial magnetic force tending to engage the clutch teeth becomes fully effective.

By making the co-acting ends of the sets of clutch teeth of hardened steel polished smooth, and lubricating them to reduce wear, a clutch according to the invention can be rendered suitable for long periods of operation with the sets of teeth in nuzzling contact. The clutch is suitable for high speeds of rotation of any of the parts thereof, since the clutch actuating means in contrast with previously known means, e. g. pawls, are not affected by centrifugal force, vibration or wear.

Figure 2:
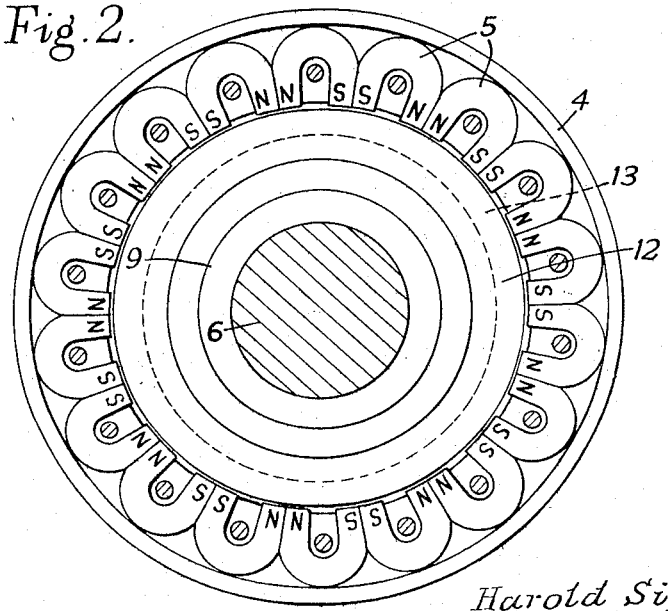
Figure 3:
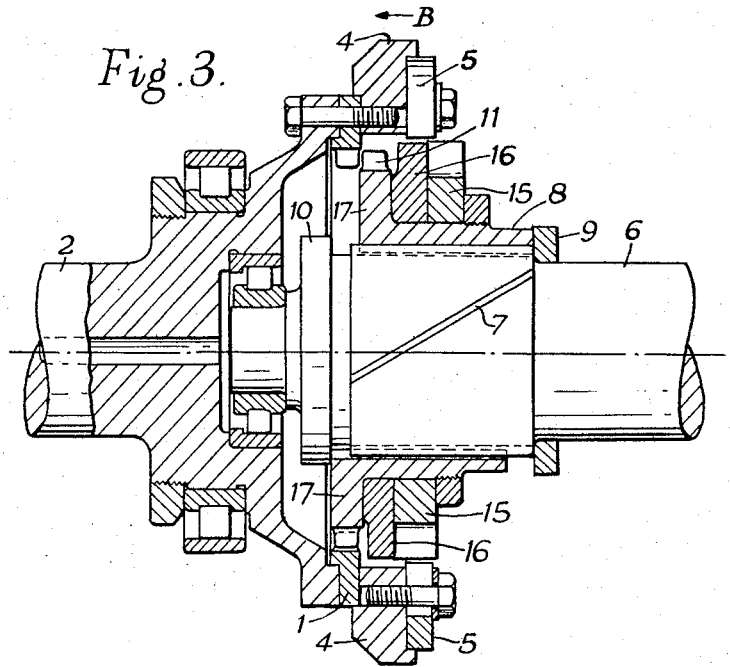
Figure 4:
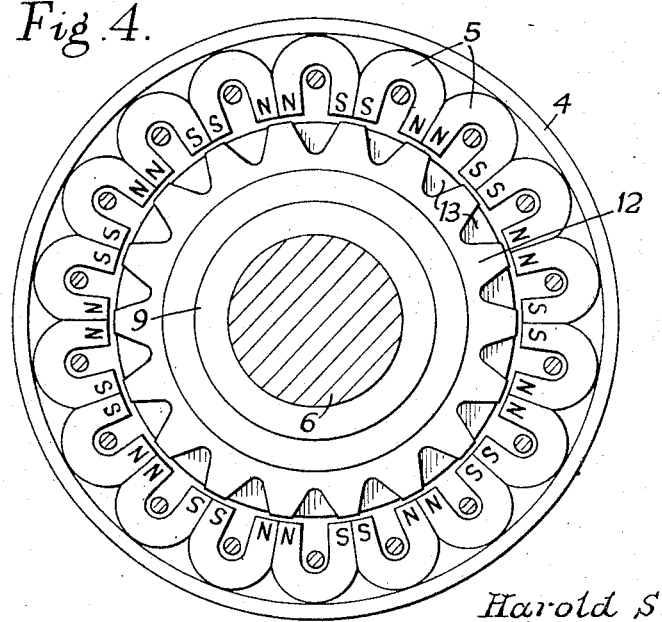
Figure 5:
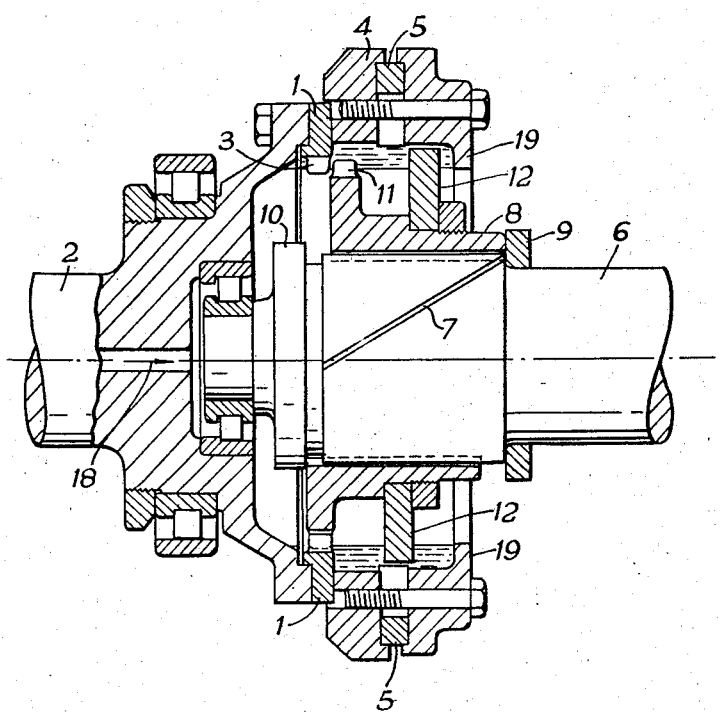

In order that the invention may be clearly understood and readily carried into effect it will now be described in more detail with reference to the accompanying drawings in which:

Fig. 1 is a view in longitudinal section of a clutch according to the invention incorporating an annular armature, and an eddy current ring for establishing drag force, Fig. 2 is a view looking in the direction of arrow A of Fig. 1, Fig. 3 shows a clutch provided with a notched armature, and an eddy current ring, Fig. 4 is a view looking in the direction of arrow B of Fig. 3 and Fig. 5 shows a clutch wherein provision is made for a ring of oil for amplifying the tangential drag force.

Referring to Figs. 1 and 2, the clutch shown comprises a first clutch member in the form of a ring 1 secured to the end of a shaft 2 and formed with a ring of internal jaw clutch teeth 3. The shaft 2 also carries a ring 4 to which are screwed magnets 5 arranged in a circular array with like poles of adjacent magnets in contact (see Fig. 2). The second clutch member is formed by a shaft 6 one end of which is journalled as shown within the end of shaft 2, and which is formed with external helical splines 7 with which engage internal helical splines in an intermediate member 8, which is thereby constrained to move helically on the shaft 6 between axial stops 9 and 10 on the shaft 6. The intermediate member 8 is formed with a ring of external jaw clutch teeth 11 which can engage with the jaw clutch teeth 3 and disengage therefrom according to the direction in which the intermediate member 8 moves helically relative to the shaft 6. In the upper part of Fig. 1 the teeth 11 are shown fully disengaged from the teeth 3, the intermediate member 8 being in contact with the axial stop 9. The lower part of the figure shows the sets of clutch teeth fully engaged, with the intermediate member 8 in contact with the axial stop 10. On the intermediate member 8 is secured an armature in the form of a ring 12, in which is set a ring 13 of copper. In the disengaged condition of the clutch the medial plane of the copper ring 13 is substantially coincident with the medial plane of the magnets 5, as shown in the upper part of Fig. 1.

The operation is as follows:

Assuming that the clutch is in the disengaged condition, that initially the shaft 2 is rotating in anti-clockwise sense as viewed from the left-hand side of Fig. 1, and that the shaft 6 is stationary. The shaft 6 is then caused to rotate in the same sense as shaft 2 and its speed is increased until it reaches synchronism with and tends to overrun shaft 2.

The magnets 5 co-operate with the armature 12 to exert on the intermediate member 8 an axial force (directed to the left in Fig. 1) which tends to draw the intermediate member towards the clutch member 1, and when the shaft 2 continues to rotate relatively somewhat faster than the shaft 6 the teeth 11 will be in smooth sliding or nuzzling contact with the teeth 3. The interaction of the magnets 5 and the copper ring 13 produces eddy currents whereby a tangential drag torque is exerted on the armature 12, this torque tending to turn the intermediate member 8 in the same direction as the shaft 2, it being understood that the torque is due to the combined effect of tangential forces set up between the clutch member 1 and the intermediate member 8 by the interaction of the individual magnets 5 and the armature 12 also the copper ring 13. This drag torque tends to screw the intermediate member along the shaft 6 (to the right in Fig. 1) i. e. away from the clutch member 1, and the drag torque is greater when the relative speed between the shafts 2 and 6 is higher. Since the tangential drag torque opposes the magnetic force tending to draw the intermediate member 8 towards the clutch member 1, at high relative speeds the pressure of the teeth 11 against the teeth 3 is low and may even be zero, or the teeth 3 and 11 may be out of contact as shown in Fig. 1. The drag torque decreases as the relative speed of rotation decreases, and falls to zero at the moment of synchronism, so that the axial magnetic force has then become fully effective to initiate engagement of the teeth 11 of the intermediate member with the teeth 3 of the clutch member 1. When thereafter the direction of relative rotation reverses due to the speed of rotation of shaft 6 overtaking the shaft 2 the torque exerted on the intermediate member by the partial engagement of the teeth 3 on the teeth 11 causes the intermediate member 8 to screw along the shaft 6 on the helical splines thereof, so as to bring the teeth 11 into full engagement with the teeth 3, further movement of the intermediate member 8 being prevented by the axial stop 10 (see lower half of Fig. 1).

When the direction of relative rotation again reverses, e. g. due to retardation of the shaft 6, the intermediate member screws along the helical splines 7 to the right until its teeth 11 are disengaged from the teeth 3, the axial stop 9 preventing the intermediate member from moving so far to the right as to render the magnets ineffective for initiating subsequent clutch engagement.

The clutch shown in Figs. 3 and 4 is similar to the clutch just described. However, in place of the annular armature of Figs. 1 and 2, there is employed a notched armature 15, shown clearly in Fig. 4, and the means for increasing the eddy current drag torque on the intermediate member comprises a copper ring 16 clamped between the armature 15 and the flange 17 on which the teeth 11 of the intermediate member are formed. If desired, the armature 15 may be adjustable in angular sense relative to the intermediate member, so as to vary the angular position of the notches relative to the teeth 11.

Fig. 5 shows a clutch according to the invention wherein instead of using an eddy current ring to amplify the tangential drag torque the required effect is obtained by the dragging action of liquid between the clutch member 1 and the intermediate member 8.

An axial bore 18 in the shaft 2 serves as a supply duct for lubricating oil, which passes from the bore 18 through the roller bearing to the space around the end of the shaft 6 that is journalled in the shaft 2. An annular oil retaining cover 19 is secured to the ring 4, whereby during rotation of the shaft 2 a ring of oil is formed as indicated, the dragging effect on the intermediate member 8 being high at high speeds of the shaft 2 relative to shaft 6. At the moment of synchronism the drag torque due to the oil is a minimum and the axial force between the magnets 5 and armature 12 is then substantially fully effective to initiate engagement of the clutch.

We claim:

1. A clutch comprising a first rotary clutch member provided with jaw clutch teeth, a second rotary clutch member coaxial with said first clutch member, and an intermediate member provided with jaw clutch teeth and constrained to move helically relative to said second clutch member, for the purpose of bringing the jaw clutch teeth on the intermediate member into and out of engagement with the jaw clutch teeth of the said first clutch member, and magnetic means for initiating engagement of the cooperating set of jaw clutch teeth on said first and intermediate members.

2. A clutch according to claim 1, wherein the said magnetic means creates a force acting in the axial direction of the clutch.

3. A clutch according to claim 2, wherein means are provided for creating a tangential drag force acting on said intermediate member so as to oppose the said magnetic force when there is relative rotation between said first and intermediate members in one direction of rotation.

4. A clutch according to claim 2, wherein the said magnetic means comprise a plurality of magnets carried by one of said first and intermediate members and adapted to exert on the other of said first and intermediate members an axial force in the direction for initiating clutch engagement.

5. A clutch according to claim 3, including an eddy current ring rotatable with the other of the said first and intermediate members whereby to increase the said tangential drag force.

6. A clutch according to claim 3, wherein said means for creating a tangential drag force acting on said intermediate member utilizes the drag effect of a liquid for increasing the said drag torque.

7. A synchronous self-shifting clutch comprising, in combination, a first rotary clutch member provided with jaw clutch teeth, a second rotary clutch member coaxial with said first clutch member, and an intermediate member provided with jaw clutch teeth and constrained to move helically relative to said second clutch member, for the purpose of bringing the jaw clutch teeth on the intermediate member into and out of engagement with the jaw clutch teeth of the said first clutch member, magnetic means for exerting an axial force on said intermediate member which tends to move it into position with the jaw clutch teeth thereon in engagement with the jaw clutch teeth on said first member, and means for creating a tangential drag force on said intermediate member opposing said magnetic force and tending to move said intermediate member in an axial direction away from said first member when there is relative rotation between said first and intermediate members in one direction of rotation.

References Cited in the file of this patent
UNITED STATES PATENTS

| | | |
|---|---|---|
| 1,601,001 | Sleeper | Sept. 28, 1926 |
| 2,258,475 | Sinclair | Oct. 7, 1941 |
| 2,584,116 | Duyck | Feb. 5, 1952 |